Patented Dec. 1, 1942

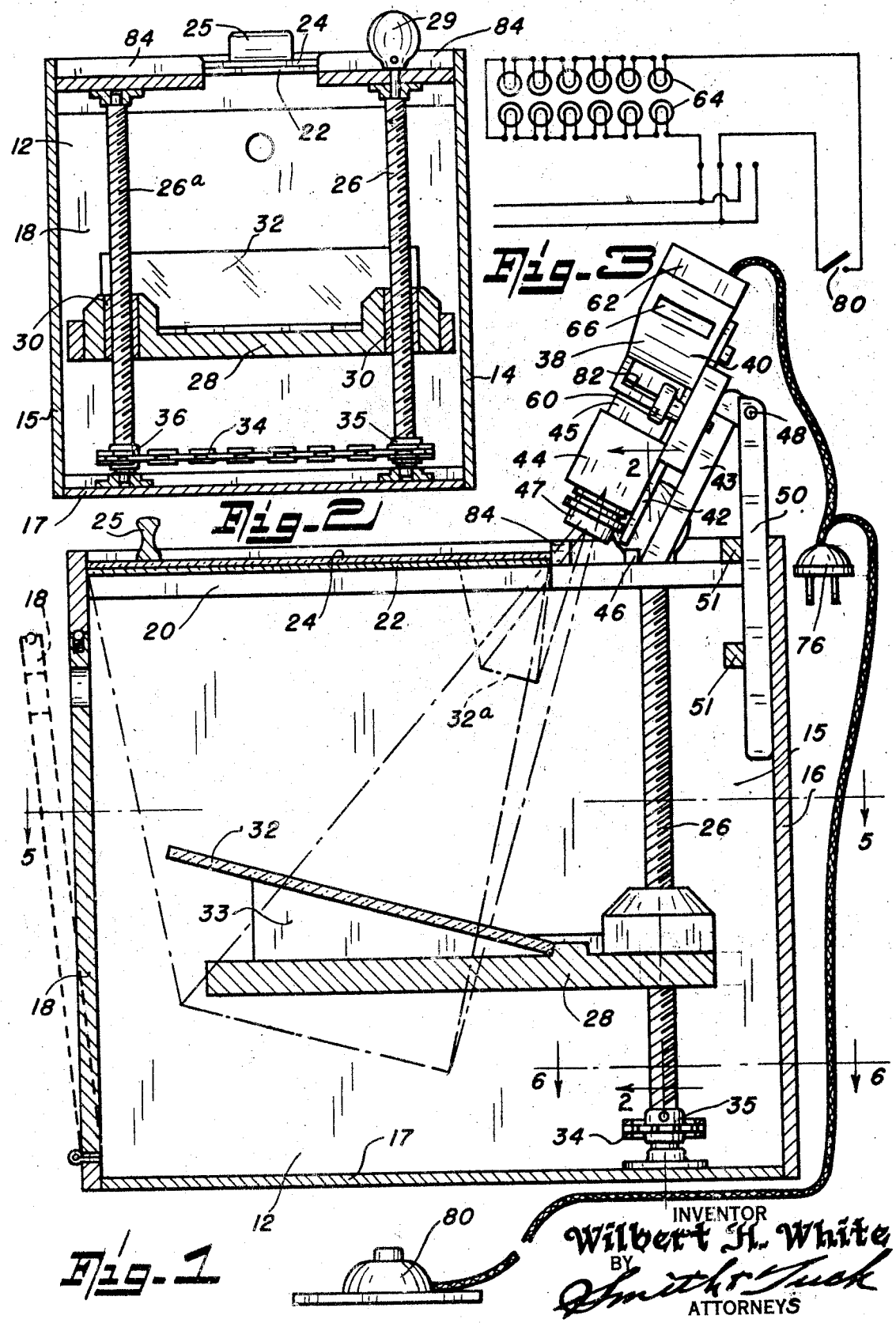

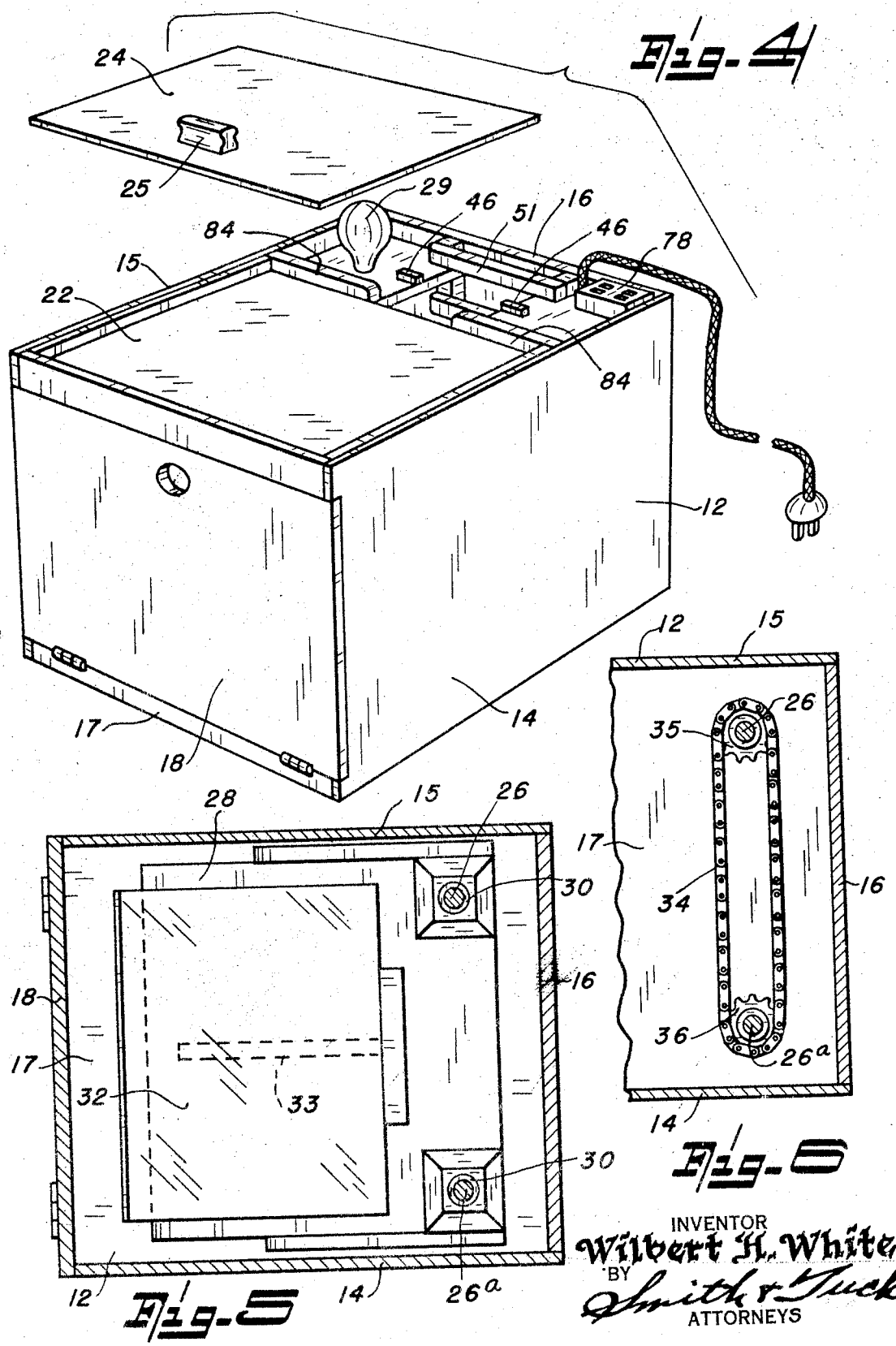

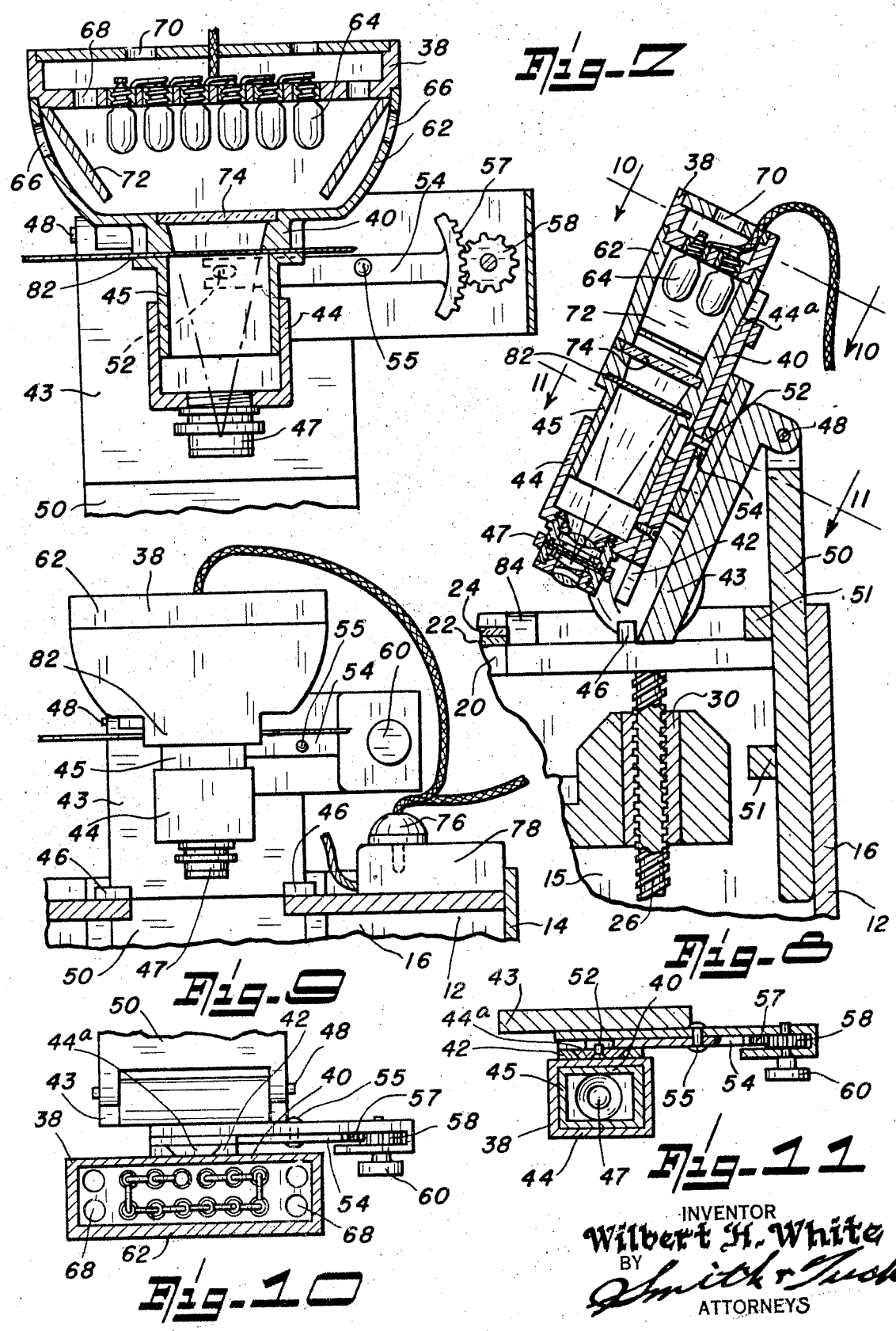

2,303,518

UNITED STATES PATENT OFFICE 2,303,518

REFLECTING ENLARGER AND VIEWER

Wilbert H. White, Leavenworth, Wash.

Application May 24, 1940, Serial No. 336,979

1 Claim. (Cl. 88—24)

My present invention relates to the art of photographic enlargers and more particularly to a reflecting enlarger and viewer.

Many types of enlargers have been offered to the public, each of which has been characterized by structures that lend themselves particularly to certain types of work. In my present device, however, it is believed that a new form of enlarger has been presented which, while permitting the full latitude of work of which the ordinary enlarger is capable, also provides a very compact storage arrangement for one's photographic equipment and provides a viewer upon which enlargements can be more completely composed than with the conventional type of enlarger. To accomplish the complete function I provide my projector or lens house with its optical arrangement so positioned as to project the image of the film to be enlarged or viewed down into a boxlike compartment. In my cabinet I provide a reflecting mirror set at an angle sufficient to reflect the image upwardly to a horizontal plane. On this plane I provide a piece of clear glass which is normally the rest for the enlarger paper if an enlargement is to be made. Immediately above the clear glass, and resting thereon, is a piece of ground glass with the ground surface resting on the upper surface of the clear glass so that, when being projected the image will be formed on the ground glass where it can be viewed from above in a very convenient manner. When the picture is composed to suit the photographer's need, the ground glass is raised and the enlargement paper, emulsion side down, is inserted so as to rest on the clear glass. Then the ground glass is repositioned, serving merely as a plane surface to hold the paper in an exact plane for complete and accurate register.

The principal object of my present invention is to provide a combination enlarger and viewer, which can be very economically constructed and which can be used in many places where the conventional equipment occupies too much space due to the height required for the projecting lens and the relatively large area required for the base board.

A further object of my invention is to provide, as a unit, a complete set of enlarging equipment. When my projector is to be stored, the mirror is normally raised to its upermost position and then, within the cabinet, adequate space is provided for the storage of the projector, paper, trays, and all the other equipment used in making enlargements. This will be of particular value to the apartment dweller, the person who must use limited quarters and who still wishes to take full advantage of an interesting hobby, or one who may wish to do commercial work as he is moving about.

Another object of my invention is to provide a very efficient, but economically constructed, optical arrangement in which a plurality of low voltage lights are employed which may be connected in a series or parallel arrangement to fit them to the current supply that is available. By using lights of small amperage, there is a notable lack of heat and the lamp housing can thus be made very small.

Another object of providing a plurality of small lamps is that the light source, instead of being substantially a point of light, is distributed over an area somewhat greater than the total area of the cell; thus, without the necessity of employing expensive condensers, reflectors, and the like, a very even distribution of light can be easily effected with nothing more than a small, single piece of ground glass disposed between the light and the lens surface.

A further object of my invention is to provide a convenient viewer for negatives so that, particularly for technical or commercial employment, the films can be studied in detail; hence those films, or those portions of selected films, that portray the needed intelligence can be quickly sought out.

Other and more specific objects will be apparent from the following description taken in connection with the accompanying drawings, wherein Figure 1 is a cross-sectional view in elevation through my enlarger and viewer.

Figure 2 is a vertical, sectional view taken along the line 2—2 of Figure 1.

Figure 3 illustrates, in diagrammatic form, one preferred wiring circuit for my projection light.

Figure 4 is a perspective view showing the arrangement of part of my cabinet with the upper ground glass raised and bracketed with the cabinet, and with the projector removed therefrom.

Figure 5 is a cross-sectional view taken along the line 5—5 of Figure 1.

Figure 6 is a fragmentary, cross-sectional view in plan taken along the line 6—6 of Figure 1.

Figure 7 is a typical, cross-sectional view through my lamp house, showing the manner in which my lights are housed and the manner of mounting and focusing the projection lens of my system.

Figure 8 is a fragmentary view showing in vertical, sectional arrangement the entire projector of my enlarger with certain parts of the cabinet.

Figure 9 is a front elevation of my projector and certain parts of the cabinet.

Figures 10 and 11 are cross-sectional views taken along similarly numbered lines of Figure 8.

Referring to the drawings, throughout which like reference characters indicate like parts, 12 designates the cabinet of my enlarger and viewer. This consists of the two end members as 14 and 15, back member 16, and the bottom 17, all of which are fixedly secured together. The front of my cabinet is provided with a door 18 which serves as a convenient opening into the cabinet for purposes of storing equipment therein and, further, for the dodging or blacking out of portions of the image during the printing or enlarging operation. On the inner sides of the cabinet a plurality of rails or cleats 20 are employed to form a rest for a plate of clear glass 22. This glass must necessarily be equal to the largest size enlargement that is to be made. Immediately above the clear glass sheet 22 is a ground glass plate 24 which is arranged to rest on glass 22 with its ground surface in contact therewith. As a matter of convenience, I provide a handle 25 secured to the ground glass so that the same may be easily lifted out, for instance, when it is desired to insert a sheet of enlarging paper.

Near the rear wall of the cabinet I provide two vertically disposed threaded rods as 26 and 26a. These rods are preferably threaded with a coarse, multiple thread so that a few turns of the operating knob 29 will serve to raise or lower table 28 very quickly. Fixedly secured to table 28 are the threaded guide members 30. It is desirable that these guides be of sufficient length so that table 28 will be rigid in all of its adjusted positions and mirror 32, supported therefrom, will be capable of adjustment without vibration. Any convenient means may be employed to position mirror 32 as support members 33. In order to further provide against vibration of mirror 32 I prefer to have both rods 26 and 26a threaded to engage the threaded members in bosses 30. To provide that both rods will have identical movement I have adopted one convenient means of connecting them together as by chain 34 which operatively connects sprockets 35 and 36 which are secured respectively to rods 26 and 26a.

The exact angle and the fore and aft positioning of mirror 32 are functions of the axis of the projector assembly 38. One convenient means of determining this angle is to make a paper pattern of the cone of light passed by the projection lamp and to so place the end of the cone so that it is parallel to glass 24. If the paper pattern is then folded, following these limitations, the fold will provide the exact angle required, it being understood that once the angle of mirror 32 is determined it remains fixed.

In order to realize fully the desirable characteristics of my enlargement viewer I have found it desirable to provide a very compact lamp house and projection system 38. This consists of a fixed housing member 40 which is positioned so as to project its light at a predetermined angle. Housing 40 is mounted over guideway 42 and is fixedly secured to the angularly disposed standard 43. This standard is pivoted at 48 to a removable pillar 50 so that when it is desired to store the enlarger, pillar 50 can be withdrawn from its supporting guides 51 and stowed inside cabinet 12. The projector 38 is positioned at its correct angle by the standard 43 engaging the stops 46 which are secured to the top of cabinet 12.

Adjustably disposed with respect to housing 40 is the lens mount 44. This mount engages the downwardly extending portion 45 of housing 40 with a light-tight fit and at its lower end is threaded or otherwise adapted to receive the enlarging or projecting lens 47.

Focusing of lens 47 is accomplished by providing an outwardly extending pin 52 in an upwardly extending portion 44a of mount 44 and this pin is engaged in a slotted or bifurcated end of a lever 54 pivoted at 55 and adjustable by some convenient means as by the gear segment 57 and pinion 58 which pinion may be operated most conveniently by a hand knob 60.

The lamp house 62 is preferably of rectangular section so as to provide mounting space for two rows of low voltage lamps 64. These lamps may be connected to a 110 volt lighting circuit after the showing of Figure 3 in which the lamps are connected in series. It will be apparent, it is believed, that by changing the voltage of the lamps, or by arranging the lamps in a combination of series and parallel wiring, they may be quickly adapted to any conventional lighting circuit. It is particularly advantageous where farm, or boat lighting circuits must be relied upon for its source of current.

In Figure 3 I have illustrated the light source as being composed of twelve lights. These lamps are preferably the type used in 9.6 volt flashlights, and when operated slightly below their full voltage rating, they generate very little heat. This is easily dissipated, however, by providing a plurality of openings in the lamp house. I have shown these openings at 66 for the incoming air with discharge openings at 68 and 70. It is necessary, with this arrangement, to provide shielding as 72 so that no direct light can pass out of the lamp house to interfere with dark room conditions. One relationship that should be maintained when using a plurality of small lights as a diffused light source, is that the bank of lights should exceed in area the area of the film to be enlarged. When this proportion is maintained there will always be full illumination out to the very margins of the projected image. I have indicated, particularly in Figure 17, a ground glass diffusing plate 74. This is a relatively small plate and can therefore be of any of the heat absorbing glasses that are used in enlargers; however, it has been found that heat absorption is not necessary for all normal uses, although it might be desirable where unhardened films are projected on the ground glass of the viewer for purposes of tracing or copying by hand or the like where a single film might be affected by the light over relatively long periods.

*Method of operation*

Normally it is intended that all the essential equipment for enlarging will be contained in the cabinet of my device and when it is to be put in service the projector 38 is first removed from the cabinet and then placed in position after the showing of Figure 1 and Figure 8. The lamp cord connector 76 is then plugged into the terminal block 78 and normally will be provided with a foot switch as 80 which may be placed in any convenient position. Another convenience is the fact that all of the controls are placed within a few inches of both the film and the enlarging surface, so that the method of operation is basically the same as that of a contact printer.

The film to be enlarged is now placed in a conventional type of film carrier as 82 and inserted in position as best indicated in Figures 7 and 8. The projected image is then reflected from mirror 32 upwardly onto the ground glass plate 24. The size of image is obtained by adjusting the vertical position of plate 32 through the means of knob 29 which acts to simultaneously turn both of the elevating, or lowering, screws 26 and 28. For prints of the smaller size the mirror will be in the position shown by the dashed line 32a. When the desired image size is obtained and the lens is accurately positioned for sharp focus, ground glass 24 is raised by means of handle 25 and the enlargement paper placed on glass 22, emulsion side down. It can be accurately positioned because one edge of the image is always projected at the edge of the horizontal rail 84 because as mirror 32 moves upwardly lens 47 moves downwardly to keep the focus correct, thus positioning the inner projected rays always in the same plane. When the enlarging paper is in position the ground glass is placed on top of the same thus holding it in intimate contact with glass 22 assuring that all points of the paper will be in exact focus. The exposure is then made in the normal manner; the period of exposure being governed by the same conditions as in all other enlargers. Normally, the effective opening of the projection lens and the speed of the paper used controls this time element. During the printing operation, if it is desired, dodging can be accomplished by opening door 18 and interrupting the light as it is projected to or up from mirror 32. When the operator is through using the enlarger the projector 38 is removed from its guideways 51, the mirror is elevated to its upper position, and adequate storage space is provided in cabinet 12 for all the essential equipment employed. Thus, the photographer will always have, in a single unit, convenient storage space for all of his essential equipment.

The foregoing description and the accompanying drawings are believed to clearly disclose a preferred embodiment of my invention but it will be understood that this disclosure is merely illustrative and that such changes in the invention may be made as are fairly within the scope and spirit of the following claim:

The combination in a photographic enlarger comprising a cabinet having an upper wall formed with a translucent window and a light projector mounted in fixed projecting position on the wall adjacent said window, and said projector including a focusing lens assembly, of a vertically adjustable reflecting mirror in said cabinet having its rear edge continuously, vertically aligned with the corresponding rear edge of the window whereby the image reflected to said window always abuts the rear edge of the window.

WILBERT H. WHITE.